(12) United States Patent
Ang et al.

(10) Patent No.: US 10,392,925 B2
(45) Date of Patent: Aug. 27, 2019

(54) SYSTEMS AND METHODS TO UTILIZE A SENSOR TO PROVIDE SPATIAL RESOLUTION IN DOWNHOLE LEAK DETECTION

(71) Applicant: Halliburton Energy Services, Inc., Houston, TX (US)

(72) Inventors: Yi Yang Ang, Singapore (SG); Nam Nguyen, Singapore (SG); Joni Lie, Singapore (SG); Yinghui Lu, The Woodlands, TX (US); Avinash Vinayak Taware, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/532,043

(22) PCT Filed: Oct. 13, 2016

(86) PCT No.: PCT/US2016/056895
§ 371 (c)(1),
(2) Date: May 31, 2017

(87) PCT Pub. No.: WO2018/071032
PCT Pub. Date: Apr. 19, 2018

(65) Prior Publication Data
US 2018/0283167 A1 Oct. 4, 2018

(51) Int. Cl.
*E21B 47/10* (2012.01)
*E21B 47/00* (2012.01)
(Continued)

(52) U.S. Cl.
CPC .......... *E21B 47/10* (2013.01); *E21B 47/0005* (2013.01); *G01M 3/24* (2013.01); *G01M 3/40* (2013.01)

(58) Field of Classification Search
CPC .................................. E21B 47/10; G01M 3/40
See application file for complete search history.

(56) References Cited

U.S. PATENT DOCUMENTS 4,114,721 A * 9/1978 Glenn, Jr. ............. E21B 47/101
181/102
4,930,111 A 5/1990 Sullivan et al.
(Continued)

FOREIGN PATENT DOCUMENTS

CA 2663497 C 4/2014
WO 2015013394 A1 7/2013
(Continued)

OTHER PUBLICATIONS

Cigada, Alfredo, et al. "Moving microphone arrays to reduce spatial aliasing in the beamforming technique: Theoretical background and numerical investigation." The Journal of the Acoustical Society of America 124.6 (2008): 3648-3658.
(Continued)

*Primary Examiner* — Kyle R Quigley
(74) *Attorney, Agent, or Firm* — McGuireWoods LLP (57) ABSTRACT

The disclosed embodiments include leak detection systems and methods of downhole leak detection. In one embodiment, the method includes obtaining physical signals measured by at least one physical sensor traveling along a wellbore. The method also includes performing a frame decomposition operation on the physical signals of a first of the at least one the physical sensor to obtain a plurality of virtual signals associated with an array of virtual sensors, each virtual sensor of the array of virtual sensors being located at a virtual distance relative to the first physical sensor, the virtual distance corresponding to a physical distance. The method further includes synchronizing the virtual signals of the array of virtual sensors. The method
(Continued)

further includes computing a spatial spectrum indicative of a location of a leak based on the synchronized virtual signals.

20 Claims, 5 Drawing Sheets

(51) Int. Cl.
*G01M 3/24* (2006.01)
*G01M 3/40* (2006.01)

(56) References Cited

U.S. PATENT DOCUMENTS

| | | | |
|---|---|---|---|
| 7,894,300 | B2 | 2/2011 | Hawthorn et al. |
| 8,789,587 | B2 | 7/2014 | Tubel et al. |
| 2006/0133203 | A1 | 6/2006 | James et al. |
| 2010/0268489 | A1* | 10/2010 | Lie .................. E21B 47/101 702/51 |
| 2011/0188346 | A1* | 8/2011 | Hull .................. E21B 47/101 367/35 |
| 2012/0060615 | A1 | 3/2012 | Farhadiroushan et al. |
| 2014/0025319 | A1* | 1/2014 | Farhadiroushan ...... G01S 5/186 702/56 |
| 2014/0110124 | A1 | 4/2014 | Goldner et al. |
| 2014/0126332 | A1 | 5/2014 | Skinner |
| 2016/0097274 | A1 | 4/2016 | Duphorne et al. |
| 2017/0275987 | A1* | 9/2017 | Al-Hussain ......... E21B 47/1015 |

FOREIGN PATENT DOCUMENTS

| | | |
|---|---|---|
| WO | 2015004487 A3 | 1/2015 |
| WO | 2015035060 A1 | 3/2015 |
| WO | 2015108668 A1 | 7/2015 |
| WO | 2016010553 | 1/2016 |
| WO | 2016130113 A1 | 8/2016 |
| WO | 2017062015 | 4/2017 |

OTHER PUBLICATIONS

International Search Report and Written Opinion dated Mar. 28, 2017; International PCT Application No. PCT/US2016/056895.

* cited by examiner

SYSTEMS AND METHODS TO UTILIZE A SENSOR TO PROVIDE SPATIAL RESOLUTION IN DOWNHOLE LEAK DETECTION

BACKGROUND

The present disclosure relates generally to systems and methods to utilize at least one sensor to provide spatial resolution in downhole leak detection.

A wellbore is often drilled proximate to a subterranean deposit of hydrocarbon resources to facilitate exploration and production of hydrocarbon resources. Casing sections are often coupled together to extend an overall length of a casing (e.g., a production casing, an intermediate casing, or a surface casing) that is deployed in the wellbore to insulate downhole tools and strings deployed in the casing as well as hydrocarbon resources flowing through casing from the surrounding formation, to prevent cave-ins, and/or to prevent contamination of the surrounding formation. A cement job is usually performed to fixedly secure the casing to the wellbore and to form a barrier that isolates different zones of the wellbore. Over time, the casing and/or the cement sheath may weaken, and one or more leaks may form at different sections of the casing and/or cement sheath. Reservoir fluids that were previously isolated from the casing or isolated from one or more sections of the casing by the cement sheath may leak through the cement sheath and may affect the integrity of the well and jeopardize hydrocarbon production.

Sensors are sometimes deployed downhole to monitor leaks. For example, sensors are sometimes mixed with cement and are fixedly deployed along the cement. Although stationary sensors may be utilized to detect leaks, sometimes, the stationary sensors are not deployed proximate to the leaks, and thereby do not provide accurate information regarding the locations of the leaks. An array of multiple sensors (sensor array) is sometimes deployed along a production tubing, which extends down the wellbore. One or more sensors of the sensor array may be positioned proximate to the leak and thereby may be operable to detect the leak. Measurements made by different sensors of the sensor array may also be compared to obtain more accurate information regarding the leak. However, the cost associated with fitting a production tubing with multiple sensors, deploying the multiple sensors, and operating the multiple sensors increases proportionally with the number of sensors deployed in the sensor array. Further, in certain wellbore environments, it may be difficult and/or impractical to deploy multiple sensors, thereby impacting leak detection accuracy of the sensor array. Further, one or more sensors of the sensor array may malfunction, which would also adversely impact the accuracy of leak information obtained by the sensor array.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to utilize at least one physical sensor to provide spatial resolution in leak detection, as well as downhole leak detectors having at least one physical sensor and operable to provide spatial resolution in leak detection. As defined herein, a physical sensor is an actual sensor that is deployed in a wellbore of a downhole environment and is operable to detect downhole leaks along the wellbore. More particularly, the physical sensor is deployed along a retractable string, such as a wireline tool string, a slickline tool string, a drill string, or another type of tool string operable to deploy the physical sensor. The retractable tool string may be deployed in a wellbore and retracted from the wellbore to facilitate the leak detector to travel between a surface location and a desired depth of the wellbore. In some embodiments, the physical sensor is a hydrophone that is operable to obtain acoustic signals indicative of the leak and originating from a source of the leak. In other embodiments, the physical sensor is an optical fiber that is operable to perform distributed acoustic sensing (DAS) or distributed strain sensing of disturbances caused by the leak. In other embodiments, the physical sensor is an electromagnetic detector operable to obtain electromagnetic signals indicative of the leak and originating from the source of the leak. In further embodiments, the physical sensor is a chemical detector operable to detect chemical imbalances caused by the leak.

As the leak detector travels up and/or down the wellbore, the physical sensor is operable to obtain physical signals indicative of the leak as detected by the physical sensor. As defined herein, "up the wellbore" and "down the wellbore" mean traveling along the wellbore towards a surface end of the wellbore, and traveling along the wellbore away from the surface end of the wellbore, respectively. The leak detector is further operable to perform a frame decomposition operation on the physical signals detected by the physical sensor. In some embodiments, the frame decomposition operation obtains a plurality of virtual signals associated with an array of virtual sensors, where each virtual sensor of the array of virtual sensors is located at a virtual distance relative to the physical sensor. As defined herein, a virtual sensor is deployed at a virtual location and a virtual distance from the physical sensor, where the virtual location and the virtual distance have values that are identical to values of a physical location and a physical distance from the physical sensor, respectively. Further, the virtual sensor is a sensor that mimics a physical sensor such that virtual signals associated with the virtual sensor are approximately equal to physical signals that a physical sensor would detect if the physical sensor is located at a physical location that corresponds to the virtual location of the virtual sensor. For example, the leak detector is operable to perform the frame decomposition operation to obtain virtual signals for eight virtual sensors, located at the location of the physical sensor and at least D-7D from the location of the physical sensor, where D is a numerical value of a physical distance from the physical sensor. The virtual signals of each virtual sensor of eight virtual sensors are approximately equal to physical signals obtained by the physical sensor if the physical sensor is located at the location of the respective virtual sensor.

The leak detector then correlates the obtained virtual signals. For example, the leak detector constructs a covariance matrix of the virtual signals obtained from the frame decomposition operation. The leak detector then adjusts values obtained from the covariance matrix to synchronize the plurality of virtual signals. The leak detector then computes a spatial spectrum indicative of a location of a leak based on the synchronized virtual signals and utilizes a beamforming technique, such as traditional beamforming, Capon's beamforming, MUSIC, parametric analysis, azimuthal analysis, and similar techniques to determine a localized peak of the spatial spectrum, where the localized peak is indicative of the location of the leak. Additional descriptions of the foregoing processes, exemplary formulas, and examples are provided in the paragraphs below and are illustrated by at least FIGS. 1-4. Further, although the foregoing operations are described to be performed by the leak detector, the operations may also be performed by a processor of another electronic device, such as a surface based controller that is communicatively connected to the physical sensor and operable to receive the physical signals detected by the physical sensor.

Figure 1A:
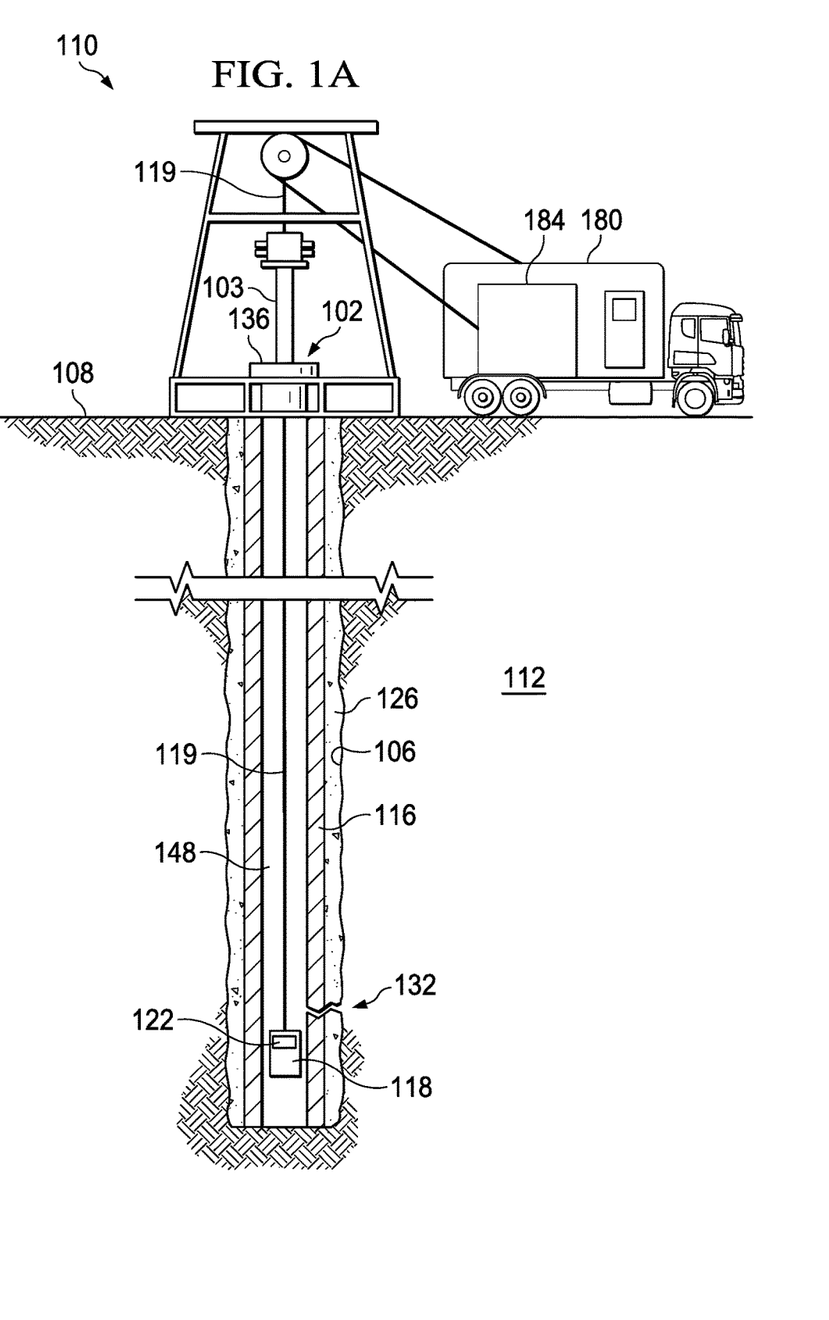
FIG. 1A is a schematic, side view of a wireline logging environment in which a leak detector having a physical sensor operable to detect leaks along a wellbore is deployed on a wireline in the wellbore.

Turning now to the figures, FIG. 1A is a schematic, side view of a wireline logging environment 100 in which a leak detector 118 having a physical sensor 122 operable to detect leaks along wellbore 106 is deployed on wireline 119 in the wellbore 106. In the embodiment of FIG. 1, a well 102 having the wellbore 106 extends from a surface 108 of the well 102 to or through a subterranean formation 112. A casing 116 is deployed along the wellbore 106 to insulate downhole tools and strings deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 126, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A vehicle 180 carrying the wireline 119 is positioned proximate the well 102. The wireline 119 along with the leak detector 118 and the physical sensor 122 are lowered through the blowout preventer 103 into the well 102. Data indicative of measurements obtained by the physical sensor 122 and/or processed by the leak detector 118 may be transmitted via the wireline 119 or via another telemetry system to the surface 108 for processing by controller 184 or by another electronic device operable to process data obtained by the physical sensor 122 and the leak detector 118. In the embodiment of FIG. 1A, the controller 184 is stored on the vehicle 180. In some embodiments, the controller 184 may also be housed in a temporary and/or permanent facility (not shown) proximate the well 102. In other embodiments, the controller 184 may also be deployed at a remote location relative to the well 102. Additional operations of the controller 184 are provided in the paragraphs below.

Figure 1B:
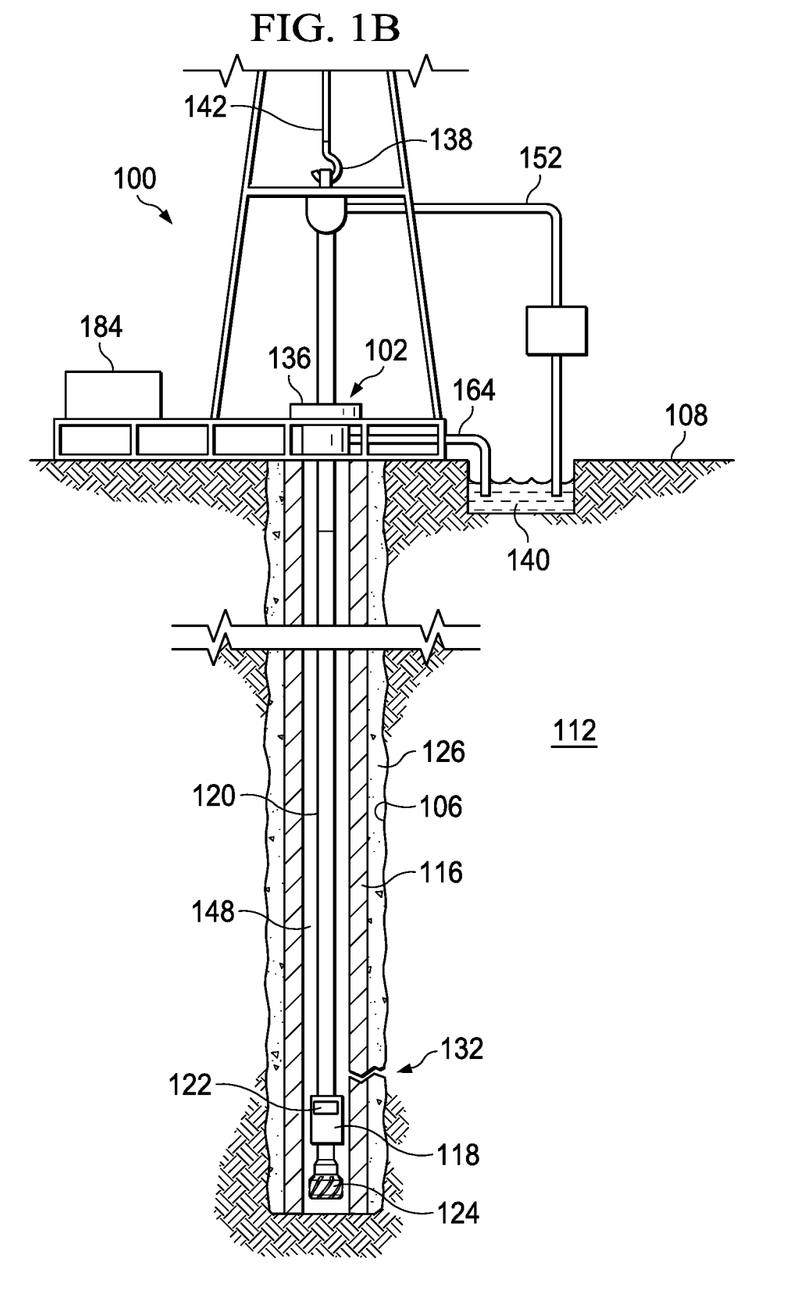
FIG. 1B is a schematic, side view of a logging while drilling (LWD) environment in which the leak detector of FIG. 1A is deployed in the wellbore to detect leaks long the wellbore.

FIG. 1B is a schematic, side view of a logging while drilling (LWD) environment 150 in which the leak detector 118 of FIG. 1A is deployed in the wellbore 106 to detect leaks long the wellbore 106. In the embodiment of FIG. 1B, a hook 138, cable 142, traveling block (not shown), and hoist (not shown) are provided to lower a tool string 120 down the wellbore 106 or to lift the tool string 120 up from the wellbore 106. The tool string 120 may be a drill string, or another type of tool string operable to deploy the leak detector 118. At wellhead 136, an inlet conduit 152 is coupled to a fluid source (not shown) to provide fluids, such as drilling fluids, downhole. The tool string 120 has an internal annulus that provides a fluid flow path from the surface 108 down to the leak detector 118. The tool string 120 is coupled to the leak detector 118, which in the embodiment of FIG. 1B, includes the physical sensor 122. The fluids travel down the tool string 120, and exit the tool string 120 at drill bit 124. The fluids flow back towards the surface 108 through a wellbore annulus 148 and exit the wellbore annulus 148 via an outlet conduit 164 where the fluids are captured in a container 140.

The physical sensor 122 is operable to detect the presence of leaks, such as first leak 132. In the examples of FIGS. 1A and 1B, the first leak 132 represents a leak in the cement sheath 126. As the physical sensor 122 traverses along the longitudinal axis of the wellbore 106, signals indicative of the first leak 132 are detected (physical signals) by the physical sensor 122. The leak detector 118 performs a frame decomposition operation on the physical signals detected by the physical sensor 122 to obtain virtual signals associated with an array of virtual sensors and constructs a covariance matrix of the plurality of virtual signals. The leak detector 118 then adjusts the covariance matrix to synchronize the plurality of virtual signals. In some embodiments, for each virtual sensor of the array of virtual sensors, the leak detector 118 determines a true steering vector of virtual signals corresponding to the respective virtual sensor, and applies the true steering vector to one or more values of the covariance matrix that represents the virtual signals corresponding to the respective virtual sensor. In further embodiments, for each virtual sensor of the array of virtual sensors, the leak detector 118 also determines a temporal correction factor of the virtual signals corresponding to the respective virtual sensor. In such embodiments, the leak detector 118 also determines a modeled transfer function of the virtual signals corresponding to the respective virtual sensor. The leak detector 118 then calculates a virtual weight of the respective virtual sensor relative the physical sensor based on the determined temporal correction factor and the modeled transfer function of the virtual signals corresponding to the respective virtual sensor. The leak detector 118 then applies the true steering vector and the virtual weight to one or more values of the covariance matrix that represent the virtual signals corresponding to the respective virtual sensor.

The leak detector 118 then computes a spatial spectrum indicative of a location of the first leak 132 based on the synchronized virtual signals. In some embodiments, the leak detector 118 utilizes a beamforming technique to determine a localized peak of the spatial spectrum, where the localized peak is indicative of the location of the first leak 132. Examples of the beamforming techniques include traditional beamforming, Capon's beamforming, MUSIC, parametric analysis, azimuthal analysis, and similar techniques to determine the localized peak. In some embodiments, the leak detector 118 is further operable to determine an approximate radial distance of the first leak 132 relative to the physical sensor 122. In one of such embodiments, the radial distance includes a first component having a value along a first x-axis, and includes a second component having a value along a second y-axis, where the x-axis and y-axis are perpendicular axes that form a plane that is approximately perpendicular to a longitudinal axis (z-axis) of the wellbore 106. For example, if the physical sensor 122 is positioned at (x, y)=(0 m, 0 m), then the radial distance of the first leak 132 may indicate that the first leak 132 is (2 m, 3 m) relative to the physical sensor 122. In another one of such embodiments, the radial distance includes a first component having a value along a first x-axis, a second component having a value along a second y-axis, and a third component having a value along a z-axis, where the x-axis and y-axis are perpendicular axes that form a plane that is approximately perpendicular to a longitudinal axis (z-axis) of the wellbore 106. For example, if the physical sensor 122 is positioned at (x, y, z)=(0 m, 0 m, 0 m), then the radial distance of the first leak 132 may indicate that the first leak 132 is (2 m, 3 m, 5 m) relative to the physical sensor 122. In further embodiments, the leak detector 118 is further operable to determine one or more angles of the first leak 132 relative to the physical sensor 122. In one of such embodiments, an angle of the first leak 132 is indicative of an azimuth of the first leak 132 relative to the physical sensor 122. In another one of such embodiments, an angle of the leak 132 is indicative of the altitude of the leak 132 relative to the physical sensor 122.

Although the leak detector 118 has been described thus far as operable to perform the operations described in the foregoing paragraphs, in one or more embodiments the foregoing operations may also be wholly or partially performed by other surfaced based or downhole electronic devices communicatively connected to the leak detector 118 and operable to receive the physical signals detected by the physical sensor 122. For example, the controller 184, which is formed by one or more electronic devices, is operable to receive the detected physical signals and to perform the foregoing operations to compute a spatial spectrum indicative of the location of the first leak 132. Additional descriptions of the algorithms used to perform the foregoing operations are provided in the paragraphs below and are illustrated in at least FIGS. 2-4. Further, although FIGS. 1A and 1B illustrate the leak detector 118 and the sensor 122 deployed in two exemplary environments, the leak detector 118 and the sensor 122 may be deployed in various drilling, completion, and production environments. Further, although FIGS. 1A and 1B illustrate the leak detector 118 having one sensor 122, in some embodiments, the leak detector 118 is operable to utilize measurements obtained by multiple sensors (not shown) to perform operations described herein to obtain a plurality of virtual sensors, synchronize virtual signals of the plurality of virtual sensors, and to compute a spatial spectrum indicative of a location of the first leak 132 or another leak in the wellbore 106 based on the synchronized virtual signals.

Figure 2:
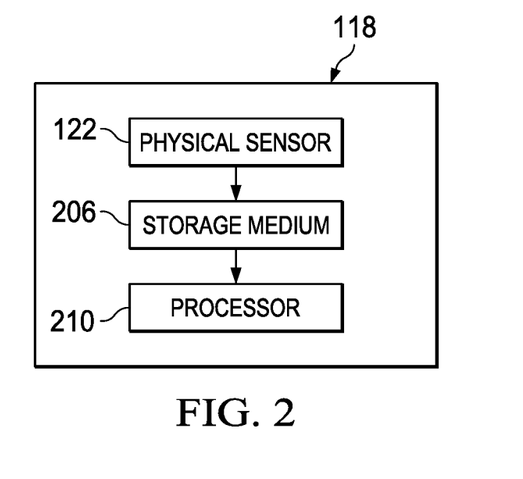
FIG. 2 illustrates a block diagram of components of the downhole leak detector of FIG. 1.

FIG. 2 illustrates a block diagram of components the first downhole leak detector 118 of FIG. 1. The downhole leak detector 118 includes the physical sensor 122. In some embodiments, the physical sensor 122 is a hydrophone that is operable to obtain acoustic signals (physical signals) indicative of the leak and originating from a source of the leak. In other embodiments, the physical sensor 122 is an optical fiber that is operable to perform DAS or distributed strain sensing of disturbances caused by the leak to detect the physical signals. In further embodiments, the physical sensor 122 is an electromagnetic sensor operable to transmit electromagnetic signals that traverse the subterranean formation 112, and to detect variations to transmitted electromagnetic signals as well as secondary electromagnetic signals induced by the first leak 132 and/or by the subterranean formation 112. In further embodiments, the physical sensor 122 is operable to detect nuclear magnet resonance signals of particles of the subterranean formation 112 and/or fluids flowing through the first leak 132. In further embodiments, the physical sensor 122 is operable to detect one or more of a vibration, displacement, velocity, torque, acceleration, conductivity, acoustic impedance, and other properties of the wellbore 106 at a location proximate to first leak 132.

The leak detector 118 also includes a storage medium 206. The storage medium 206 is a machine-readable medium and may be formed from data storage components such as, but not limited to, read-only memory (ROM), random access memory (RAM), flash memory, magnetic hard drives, solid state hard drives, as well as other types of data storage components and devices. In some embodiments, the storage medium 206 includes multiple data storage devices. Physical signals detected by the physical sensor 122, as well as virtual signals associated with virtual sensors are stored on the storage medium 206. The storage medium 206 also includes instructions for operating the leak detector 118 as well as instructions for establishing communications with other downhole and surface based electronic devices such as the controller 184.

The leak detector 118 also includes a processor 210 that is operable to execute the instructions stored in the storage medium 206 to obtain the physical signals detected by the physical sensor 122 as the physical sensor 122 travels along the wellbore 106. The processor 210 is also operable to perform a frame decomposition operation on the physical signals of the physical sensor 122 to obtain a plurality of virtual signals associated with an array of virtual sensors. The processor 210 is further operable to construct a covariance matrix of the plurality of the virtual signals obtained from the frame decomposition operation. The processor 210 is further operable to adjust values of the covariance matrix to synchronize the plurality of the virtual signals. The processor 210 is further operable to compute a spatial spectrum indicative of a location of the leak based on the synchronized virtual signals. The processor 210 is further operable to utilize a beamforming technique disclosed herein to determine a localized peak of the spatial spectrum, where the localized peak is indicative of the location of the leak. In one of such embodiments, the processor 210 is housed within a casing of the leak detector 118.

Although FIG. 2 illustrates the processor 210 as a component of the leak detector 118, in other embodiments, a processor of a surface based electronic device (surface based processor), such as the controller 184 is also operable to perform the operations of the processor 210. In one of such embodiments, physical signals obtained by the sensor 122 are transmitted to the controller 184 via one or more downhole telemetry systems. The surface based processor is operable to perform the operations described herein to perform a frame decomposition operation on the physical signals to obtain a plurality of virtual signals associated with an array of virtual sensors, construct a covariance matrix of the plurality of the virtual signals obtained from the frame decomposition operation, adjust values of the covariance matrix to synchronize the plurality of virtual signals, compute a spatial spectrum indicative of a location of the leak based on the synchronized signals, utilize beamforming to determine a localized peak of the spatial spectrum, as well as other operations described herein. In further embodiments, the processor 210 is a sub-component of the physical sensor 122. In further embodiments, the processor 210 is a separate component that is deployed at a downhole location and is operable to perform the operations described herein to compute the spectral spectrum indicative of the location of the first leak 132. In each of the foregoing embodiments, the processor 210 and the leak detector 118 form a leak detection system that performs the operations described herein to compute a spatial spectrum indicative of a location of a leak based on the synchronized virtual signals.

Figure 3A:
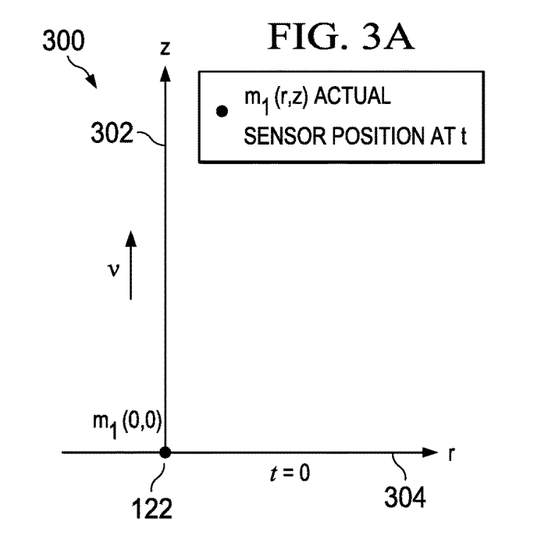
FIG. 3A illustrates a schematic view of the physical sensor of FIG. 1 at time t=0 as the physical sensor travels along a longitudinal axis (z-axis) of the wellbore at a velocity equal to v.
Figure 3B:
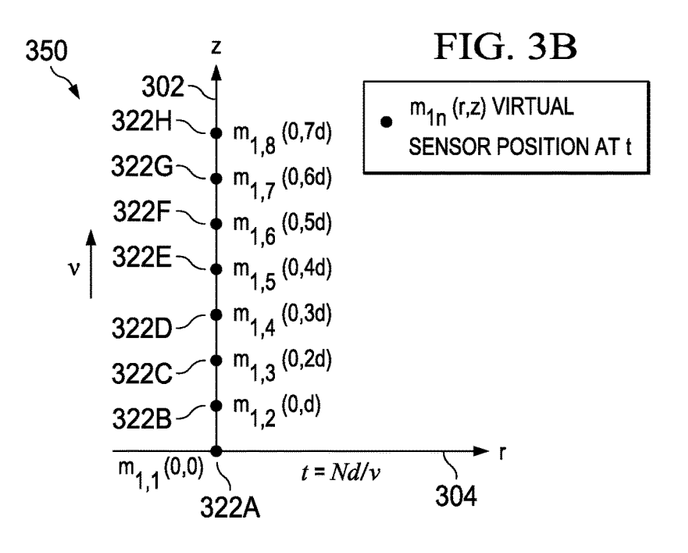
FIG. 3B illustrates an array of virtual sensors formed based on the physical sensor of FIG. 3A as the physical sensor travels along the z-axis a longitudinal axis of the wellbore at velocity v.

FIG. 3A illustrates a schematic view of the physical sensor 122 of FIG. 1 at time t=0 as the physical sensor 122 travels along a longitudinal axis (z-axis) 302 of the wellbore at a velocity equal to v. At time t=0, the location of the physical sensor 122 along a r-axis 304 and the z-axis 302 is (0, 0). As the physical sensor 122 travels along the z-axis, samples of physical signals detected by the physical sensor 122 are decomposed utilizing a frame decomposition operation into multiple frames, where the quasi-stationary condition of each frame may be preserved. A discrete time signal is quasi-stationary if its first and second order statistics are finite and well defined. Each frame of the multiple decomposed frames is utilized to form a virtual sensor of the array of virtual sensors 322A-322H. FIG. 3B illustrates an array of virtual sensors 322A-322H formed based on the physical sensor 122 of FIG. 3A as the physical sensor 122 travels along the z-axis 302 a longitudinal axis of the wellbore at velocity v. Each virtual sensor is associated with virtual signals, which are approximate to physical signals that would be detected by the physical sensor 122 if the physical sensor 122 is at the location of the respective virtual sensor. Once the array of virtual sensors 322A-322H is formed, a covariance matrix may be constructed using the virtual signals and may be subsequently adjusted using one or more operations described herein to compute a spatial spectrum indicative of the location of the leak.

Figure 4:
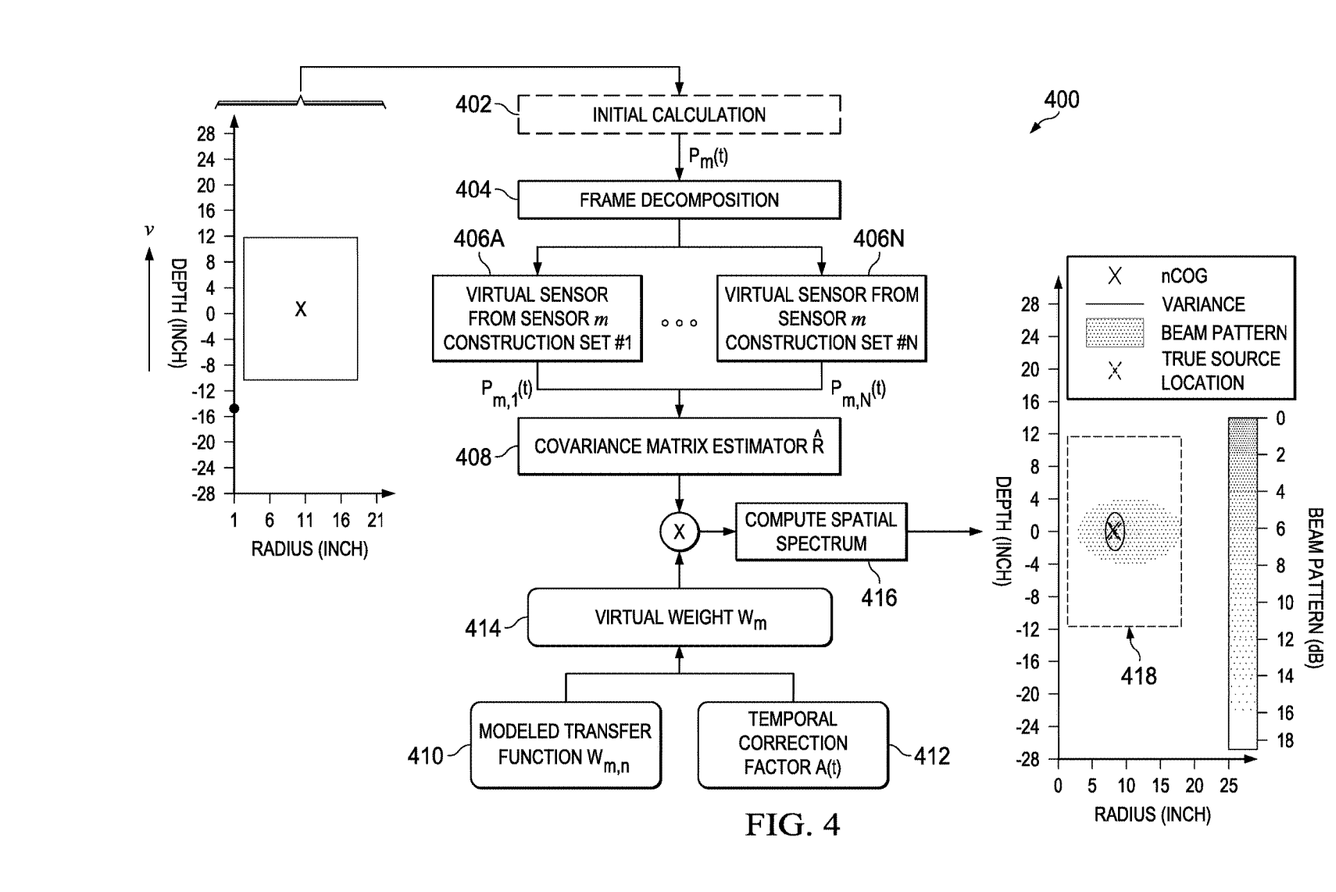
FIG. 4 illustrates a block diagram of a process for utilizing a virtual array formed from one physical sensor (one sensor array) such as the physical sensor of FIG. 1 to compute a spatial spectrum indicative of a location of the leak, such as the first leak of FIG. 1.

FIG. 4 illustrates a block diagram of a process 400 for utilizing a virtual array formed from one physical sensor (one sensor array) such as the physical sensor 122 of FIG. 1 to compute a spatial spectrum indicative of a location of a leak, such as the first leak 132 of FIG. 1. At block 402, initial calculations are performed to determine the initial position of the physical sensor 122. In the example of FIG. 4, the physical sensor 122 ($m_1$) is initially located at origin where the location of the physical sensor 122 across two perpendicular axes x and y is expressed as (x, y)=(0, 0). The physical sensor 122 is operable to detect a near field leaking source signal, $S_0(t)$, where the leaking source signal is located at a spatial position of $r_0=(x_0,y_0)$. Further, the relative displacement $\Delta r$ attributed to the movement of the physical sensor 122 with a velocity of v at time t may be expressed as $\Delta r(t)=vt$. As such, the received signal of the physical sensor 122 may be determined by the following equation:

$$p_1(t)=a_1(r_0+\Delta r(t))s_o(t)+q(t), 0 \leq t \leq \Delta T, \quad \text{EQ. 1}$$

where $a_1(\bullet)$, denotes the signal steering vector towards the physical sensor 122 that determines the phase response of the acoustic source at position $r_0=(x_o,y_o)$, where $y_o$ denotes the perpendicular distance (or radius) of the source with respect to the x-axis and $x_o$ denotes the distance covered along the x-axis, where q(t), is the additive white Gaussian Noise that captures the effects of thermal and environmental noise, and where $\Delta T$ represents an acquisition window frame of the physical sensor.

At block 404, a frame decomposition operation decomposing the detected physical signals into multiple frames is performed. More particularly, as the physical sensor 122 moves within the acquisition window frame $\Delta T$, frame decomposition may be performed within $\Delta T$ to form N number of virtual sensors. At block 406A-406N, an array of N total virtual sensors is formed based on the frame decomposition operation described herein. A mathematical expression of the array of N total sensors may be expressed as the following equation:

$$p_{1,n}(t) = p_1\left(t + \frac{\Delta T}{N}(n-1)\right) \text{ with } 0 \leq t \leq \frac{\Delta T}{N}, \quad \text{EQ. 2}$$

where $n \in [1, N]$ is the spatial index to denote the virtual sensor number, N is the total number of virtual sensors is the virtual array, such that $\Delta T/N$ satisfies the quasi-stationary condition. Further, each respective virtual sensor of N virtual sensors is located at $[m_{1,1} \ldots m_{1,N}]$, respectively, where the location of the respective virtual sensor may be determined based on the following equation:

$$m_{1,n} = m_1 + v\frac{(n-\varepsilon)\Delta T}{N} \quad \text{EQ. 3}$$

where $\varepsilon \in (0,1]$ is the percentage of the offset from origin.

The virtual signals associate with the N virtual sensors positioned at $[m_{1,1} \ldots m_{1,N}]$ expressed based on $p_{1,n}(t)$ may be expressed based on the following equation:

$$p_1(t) = [p_{1,1}(t) \ldots p_{1,N}(t)] \text{ with } 0 \leq t \leq \frac{\Delta T}{N} \quad \text{EQ. 4}$$

In some embodiments, when the physical sensor 122 is moving at velocity v, the physical sensor 122 also moves with an acquisition window of $\Delta T=Nd/v$ to construct a virtual array with N sensors with inter-element spacing of d, where d is the inter element virtual sensor spacing.

At the covariance matrix estimator block 408, a covariance matrix of the plurality of virtual signals is constructed from the virtual signals obtained from EQ. 4. is constructed from the plurality of virtual signals. More particularly, the following equation builds on EQ. 4 to construct a N×N covariance matrix:

$$\hat{R}_{pp} = E[p(t)p^H(t)] = \frac{N}{\Delta T}\int_0^{\Delta T/N} p(t)p^H(t)dt. \qquad \text{EQ. 5}$$

At blocks 410 and 412, a modeled transfer function of virtual signals corresponding to each respective virtual sensor of the array of virtual sensors and a temporal correction factor of the virtual signals are determined and utilized to calculate a virtual weight of the respective virtual sensor. At block 414, the virtual weight is then applied to the covariance matrix to adjust the covariance matrix. Further, a true steering vector of virtual signals corresponding to each respective virtual sensor is also determined and also used to adjust the covariance matrix.

At block 416, a spatial spectrum 418 indicative of the location of the leak is computed based on the adjusted covariance matrix. A beamforming technique disclosed herein may utilize EQ. 5 to determine a localized peak of the spatial spectrum 418, where the localized peak is indicative of the location of the leak. More particularly, the localized peak may be determined by performing the foregoing operations to construct the array of virtual sensors 322A-322H based on the physical sensor 122 and then searching for the peaks that indicate the location. For example, $\mathcal{R} = \{\hat{r}_0 \ldots \hat{r}_K\}$ denote the set that contains the grid location in which the spatial spectrum scanning is performed. For each location, the steering vector $a_1(\hat{r}_j)$ may be computed and applied to the Capon beamforming technique by computing the spatial spectrum, where $$P_{Capon}^{OSA}(\hat{r}_j) = \frac{1}{a_1^H(\hat{r}_j)\hat{R}_{pp}^{-1}a_1(\hat{r}_j)}.$$

Finally, the location of the source may be found as the argument that maximizes the spatial spectrum, where $P_{Capon}^{OSA}(\hat{r}_j)$, expressed as:

$$\hat{r}_k = \arg\max_{\hat{r}_j \in \mathcal{R}} P_{Capon}^{OSA}(\hat{r}_j) \qquad \text{EQ. 6}$$

where $(\bullet)^H$ corresponds to the Hermitian operation, where $a_1(\hat{r}_j)$ is modelled with the virtual weights $w_1(\hat{r}_j)=A(t_1)[w_{1,1}(\hat{r}_j) \ldots w_{1,N}(\hat{r}_j)]^T$ for free field corresponding to the virtual weights steering vector of the virtual sensor position at $[m_{1,1} \ldots m_{1,N}]^T$ due to the physical sensor 122 $m_1$. $w_{1,n}(\hat{r}_j)$ is the transfer function that models the time delay from position $\hat{r}_j$ to the virtual sensor position at $m_{1,n}$, and where $A(t_1)=\text{diag}(e^{j\omega t_{1,1}}, \ldots, e^{j\omega t_{1,N}})$ is the temporal correction factor with $t_{1,1}=[t_{1,1}, \ldots, t_{1,N}]$ being the time delay to synchronize the virtual sensors to a common time frame, where $\omega$ is the angular frequency of the impinging signal.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a method of downhole leak detection, the method comprising obtaining physical signals detected by at least one physical sensor traveling along a wellbore; performing a frame decomposition operation on the physical signals of a first physical sensor of the at least one physical sensor to obtain a plurality of virtual signals associated with an array of virtual sensors, each virtual sensor of the array of virtual sensors being located at a virtual distance relative to the first physical sensor, the virtual distance corresponding to a physical distance; synchronizing the virtual signals of the array of virtual sensors; and computing a spatial spectrum indicative of a location of a leak based on the synchronized virtual signals.

Clause 2, the method of clause 1, further comprising utilizing a beamforming technique to determine a localized peak of the spatial spectrum, wherein the localized peak is indicative of the location of the leak.

Clause 3, the method of clause 1 or 2, further comprising determining an approximate radial distance of the leak relative to the first physical sensor, wherein the location of the leak is expressed by the approximate radial distance.

Clause 4, the method of any one of clauses 1-3, wherein the approximate radial distance comprises two components along two perpendicular axes that form a plane along which the first physical sensor is displaced, and wherein determining the approximate radial distance comprises determining a distance along a first component (x-axis) and a distance along a second component (y-axis).

Clause 5, the method of at least one of clauses 1-4, wherein the radial distance comprises a third component along an axis (z-axis) normal to the plane which the first physical sensor is displaced along, and wherein determining the approximate radial distance comprises determining a distance along the third component.

Clause 6, the method of at least one of clauses 1-5, further comprising determining a true steering vector of virtual signals corresponding to a virtual sensor of the array of virtual sensors; and applying the true steering vector to one or more values of a covariance matrix that represents the virtual signals corresponding to the virtual sensor.

Clause 7, the method of at least one of clauses 1-6, further comprising determining a temporal correction factor of the virtual signals corresponding to the virtual sensor; determining a modeled transfer function of the virtual signals corresponding to the virtual sensor; calculating a virtual weight of the virtual sensor relative to the first physical sensor based on the temporal correction factor and the modeled transfer function; and applying the virtual weight to one or more values of the covariance matrix that represent the virtual signals corresponding to the virtual sensor.

Clause 8, the method of at least one of clauses 1-7, wherein obtaining the signals of the first physical sensor comprises determining signals at an origin location $p_1(t)$ and a relative displacement of the first physical sensor due to movement of the first physical sensor.

Clause 9, the method of at least one of clauses 1-8, wherein the signals of the first physical sensor at $p_1(t)$ is approximately equal to $a_1(r_0+\Delta r(t))s_o(t)+q(t)$, $0 \le t \le \Delta T$, wherein the origin location is located at (0, 0) along two perpendicular axes (x, y) that form a plane the first physical sensor and the leak are displaced along, wherein $s_o(t)$ represents a source signal of the leak located at location $r_0=(x_o,y_o)$, $\Delta r(t)$ represents a relative displacement due to movement of the first physical sensor, $a_1(r_0+\Delta r(t))$ is a signal steering vector towards the first physical sensor, and wherein $\Delta T$ is an acquisition window timeframe.

Clause 10, the method of at least one of clauses 1-9, wherein the array of virtual sensors comprises a total of N virtual sensors, wherein virtual signals associated with each respective virtual sensor are approximately $$p_{1,n}(t) = p_1\left(t + \frac{\Delta T}{N}(n-1)\right) \text{ with } 0 \leq t \leq \frac{\Delta T}{N},$$

wherein $n \in [1, N]$ and denotes a virtual sensor number of said respective virtual sensor.

Clause 11, the method of at least one of clauses 1-10, wherein synchronizing the virtual signals of the array of virtual sensors comprises constructing a covariance matrix based on the plurality of the virtual signals obtained from the frame decomposition operation.

Clause 12, the method of at least one of clauses 1-11, wherein the virtual distance of each respective sensor of N virtual sensors relative to the first physical sensor is $[m_{1,1} \ldots m_{1,N}]$, wherein $$m_{1,n} = m_1 + v\frac{(n-\varepsilon)\Delta T}{N}.$$

Clause 13, the method of at least one of clauses 1-12, wherein the first physical sensor is traveling along the wellbore at an approximately constant velocity.

Clause 14, the method of at least one of clauses 1-13, wherein the at least one physical sensor consists the first physical sensor.

Clause 15, a downhole leak detection system comprising a leak detector having a physical sensor operable to travel along a wellbore and detect physical signals indicative of a leak proximate the physical sensor; and a processor communicatively connected to the leak detector and operable to perform a frame decomposition operation on the physical signals of the physical sensor to obtain a plurality of virtual signals associated with an array of virtual sensors, each virtual sensor of the array of virtual sensors being located at a virtual distance relative to the physical sensor, the virtual distance corresponding to a physical distance; synchronize the virtual signals of the array of virtual sensors; compute a spatial spectrum indicative of a location of a leak based on the synchronized virtual signals; and utilize a beamforming technique to determine a localized peak of the spatial spectrum, wherein the localized peak is indicative of the location of the leak.

Clause 16, the downhole leak detection system of clause 15, wherein the processor is further operable to determine a true steering vector of virtual signals corresponding to a virtual sensor of the array of virtual sensors; and apply the true steering vector to one or more values of a covariance matrix that represents the virtual signals corresponding to the virtual sensor.

Clause 17, the downhole leak detection system of clause 15 or 16, wherein the processor is further operable to determine a temporal correction factor of the virtual signals corresponding to the virtual sensor; determine a modeled transfer function of the virtual signals corresponding to the virtual sensor; calculate a virtual weight of the virtual sensor relative to the physical sensor based on the temporal correction factor and the modeled transfer function; and apply the virtual weight to one or more values of the covariance matrix that represent the virtual signals corresponding to the virtual sensor.

Clause 18, the downhole leak detection system of any of clauses 15-17, wherein the processor is a component of the leak detector and is disposed inside a casing of the leak detector.

Clause 19, the downhole leak detection system of any of clauses 15-18, wherein the processor is a component of a surface-based electronic device.

Clause 20, a non-transitory machine-readable medium comprising instructions stored therein, for execution by a processor, which when executed by the processor, causes the processor to perform operations comprising obtaining physical signals detected by a physical sensor traveling along a wellbore; performing a frame decomposition operation on the physical signals of the physical sensor to obtain a plurality of virtual signals associated with an array of virtual sensors, each virtual sensor of the array of virtual sensors being located at a virtual distance relative to the physical sensor, the virtual distance corresponding to a physical distance; constructing a covariance matrix of the plurality of the virtual signals obtained from the frame decomposition operation; adjusting values of the covariance matrix to synchronize the plurality of the virtual signals; computing a spatial spectrum indicative of a location of a leak based on the synchronized virtual signals; and utilizing a beamforming technique to determine a localized peak of the spatial spectrum, wherein the localized peak is indicative of the location of the leak.

Clause 21, the non-transitory machine-readable medium of claim 20, further comprising instructions stored therein, which when executed by the processor, causes the processor to perform operations comprising determining a temporal correction factor of the virtual signals corresponding to the virtual sensor; determining a modeled transfer function of the virtual signals corresponding to the virtual sensor; calculating a virtual weight of the virtual sensor relative to the physical sensor based on the temporal correction factor and the modeled transfer function; determining a true steering vector of virtual signals corresponding to a virtual sensor of the array of virtual sensors; and applying the true steering vector and the virtual weight to one or more values of the covariance matrix that represent the virtual signals corresponding to the virtual sensor.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. A method of downhole leak detection, comprising:
deploying a downhole leak detector having at least one physical sensor into a wellbore;
obtaining physical signals detected by the at least one physical sensor while the downhole leak detector is traveling along the wellbore;
performing a frame decomposition operation on the physical signals of a first physical sensor of the at least one physical sensor to obtain a plurality of virtual signals associated with an array of virtual sensors, each virtual sensor of the array of virtual sensors being located at a virtual distance relative to the first physical sensor, the virtual distance corresponding to a physical distance away from the first physical sensor;
determining a temporal correction factor of the virtual signals corresponding to a virtual sensor of the plurality of virtual sensors;
determining a modeled transfer function of the virtual signals corresponding to the virtual sensor;
calculating a virtual weight of the virtual sensor relative to the first physical sensor based on the temporal correction factor and the modeled transfer function;
applying the virtual weight to one or more values of a covariance matrix that represents the virtual signals corresponding to the virtual sensor;
synchronizing the virtual signals of the array of virtual sensors; and
computing a spatial spectrum indicative of a location of a leak based on the synchronized virtual signals.

2. The method of claim 1, further comprising utilizing a beamforming technique to determine a localized peak of the spatial spectrum, wherein the localized peak is indicative of the location of the leak.

3. The method of claim 2, further comprising determining an approximate radial distance of the leak relative to the first physical sensor, wherein the location of the leak is expressed by the approximate radial distance.

4. The method of claim 3, wherein the approximate radial distance comprises two components along two perpendicular axes that form a plane along which the first physical sensor is displaced along, and wherein determining the approximate radial distance comprises determining a distance along a first component (x-axis) and a distance along a second component (y-axis).

5. The method of claim 4, wherein the radial distance comprises a third component along an axis (z-axis) normal to the plane which the first physical sensor is displaced along, and wherein determining the approximate radial distance comprises determining a distance along the third component.

6. The method of claim 1, further comprising:
determining a true steering vector of virtual signals corresponding to the virtual sensor, and
applying the true steering vector together with the temporal correction factor to one or more values of the covariance matrix.

7. The method of claim 1, wherein obtaining the signals of the first physical sensor comprises determining signals at an origin location $p_1(t)$ and a relative displacement of the first physical sensor due to movement of the first physical sensor.

8. The method of claim 7, wherein the signals of the first physical sensor at $p_1(t)$ is approximately equal to $a_1(r_0+\Delta r(t))s_o(t)+q(t)$, $0 \le t \le \Delta T$, wherein the origin location is located at (0, 0) along two perpendicular axes (x, y) that form a plane the first physical sensor and the leak are displaced along, wherein $s_o(t)$ represents a source signal of the leak located at location $r_0=(x_o, y_o)$, $\Delta r(t)$ represents a relative displacement due to movement of the first physical sensor, $a_1(r_0+\Delta r(t))$ is a signal steering vector towards the first physical sensor, and wherein $\Delta T$ is an acquisition window timeframe, and $q(t)$, represents an additive white Gaussian Noise that captures effects of thermal and environmental noise.

9. The method of claim 8, wherein the array of virtual sensors comprises a total of N virtual sensors, wherein virtual signals associated with each respective virtual sensor are approximately $$p_{1,n}(t) = p_1\left(t + \frac{\Delta T}{N}(n-1)\right) \text{ with } 0 \le t \le \frac{\Delta T}{N},$$

and wherein $n \in [1, N]$ and denotes a virtual sensor number of said respective virtual sensor.

10. The method of claim 9, wherein synchronizing the virtual signals of the array of virtual sensors comprises constructing a covariance matrix based on the plurality of the virtual signals obtained from the frame decomposition operation.

11. The method of claim 1, wherein the virtual distance of each respective sensor of N virtual sensors relative to the first physical sensor is $[m_{1,1} \ldots m_{1,N}]$, wherein $$m_{1,n} = m_1 + v\frac{(n-\varepsilon)\Delta T}{N},$$

wherein $n \in [1,N]$ is a spatial index to denote a respective virtual sensor number, $\varepsilon \in (0,1]$ is a percentage of the offset from origin, $\Delta T$ is an acquisition window frame, and V is a velocity of the first physical sensor.

12. The method of claim 1, wherein the physical sensor is traveling along the wellbore at an approximately constant velocity.

13. The method of claim 1, wherein the at least one physical sensor consists of only the first physical sensor.

14. A downhole leak detection system comprising:
a leak detector having a physical sensor operable to travel along a wellbore and detect physical signals indicative of a leak proximate the physical sensor; and
a processor communicatively coupled to the leak detector and operable to:
perform a frame decomposition operation on the physical signals of the physical sensor to obtain a plurality of virtual signals associated with an array of virtual sensors, each virtual sensor of the array of virtual sensors being located at a virtual distance relative to the physical sensor, the virtual distance corresponding to a physical distance away from the first physical sensor;
determine a temporal correction factor of the virtual signals corresponding to a virtual sensor of the array of virtual sensors;

determine a modeled transfer function of the virtual signals corresponding to the virtual sensor;

calculate a virtual weight of the virtual sensor relative to the first physical sensor based on the temporal correction factor and the modeled transfer function;

apply the virtual weight to one or more values of a covariance matrix that represents the virtual signals corresponding to the virtual sensor;

synchronize the virtual signals of the array of virtual sensors;

compute a spatial spectrum indicative of a location of a leak based on the synchronized virtual signals; and utilize a beamforming technique to determine a localized peak of the spatial spectrum, wherein the localized peak is indicative of the location of the leak.

15. The downhole leak detection system of claim 14, wherein the processor is further operable to:

determine a true steering vector of virtual signals corresponding to the virtual sensor; and apply the true steering vector to one or more values of the covariance matrix.

16. The downhole leak detection system of claim 14, wherein the processor is a component of the leak detector and is disposed inside a casing of the leak detector.

17. The downhole leak detection system of claim 14, wherein the processor is a component of a surface-based electronic device.

18. A non-transitory machine-readable medium comprising instructions stored therein, for execution by a processor, which when executed by the processor, causes the processor to perform operations comprising:

obtaining physical signals detected by a physical sensor traveling along a wellbore;

performing a frame decomposition operation on the physical signals of the physical sensor to obtain a plurality of virtual signals associated with an array of virtual sensors, each virtual sensor of the array of virtual sensors being located at a virtual distance relative to the physical sensor, the virtual distance corresponding to a physical distance away from the physical sensor;

constructing a covariance matrix of the plurality of the virtual signals obtained from the frame decomposition operation;

determining a temporal correction factor of the virtual signals corresponding to a virtual sensor of the array of virtual sensors;

determining a modeled transfer function of the virtual signals corresponding to the virtual sensor;

calculating a virtual weight of the virtual sensor relative to the physical sensor based on the temporal correction factor and the modeled transfer function;

applying the virtual weight to one or more values of the covariance matrix that represents the virtual signals corresponding to the virtual sensor;

adjusting values of the covariance matrix to synchronize the plurality of the virtual signals;

computing a spatial spectrum indicative of a location of a leak based on the synchronized virtual signals; and utilizing a beamforming technique to determine a localized peak of the spatial spectrum, wherein the localized peak is indicative of the location of the leak.

19. The non-transitory machine-readable medium of claim 18, further comprising instructions stored therein, which when executed by the processor, causes the processor to perform operations comprising:

determining a true steering vector of virtual signals corresponding to the virtual; and applying the true steering vector to one or more values of the covariance matrix.

20. A method of downhole leak detection, comprising:

deploying a downhole leak detector having at least one physical sensor into a wellbore;

obtaining physical signals detected by the at least one physical sensor while the downhole leak detector is traveling along the wellbore;

performing a frame decomposition operation on the physical signals of a first physical sensor of the at least one physical sensor to obtain a plurality of virtual signals associated with an array of virtual sensors, each virtual sensor of the array of virtual sensors being located at a virtual distance relative to the first physical sensor;

determining a temporal correction factor of the virtual signals corresponding to a virtual sensor of the plurality of virtual sensors;

determining a modeled transfer function of the virtual signals corresponding to the virtual sensor;

calculating a virtual weight of the virtual sensor relative to the first physical sensor based on the temporal correction factor and the modeled transfer function;

applying the virtual weight to one or more values of a covariance matrix that represents the virtual signals corresponding to the virtual sensor;

synchronizing the virtual signals of the array of virtual sensors; and computing a spatial spectrum indicative of a location of a leak based on the synchronized virtual signals.

* * * * *